United States Patent [19]

Dolan et al.

[11] Patent Number: 4,519,265
[45] Date of Patent: May 28, 1985

[54] DAMPENING SHOES FOR SYNCHRONIZER GEARS

[75] Inventors: Courtney F. Dolan, Syracuse; Stewart J. Woodcock, Fayetteville, both of N.Y.

[73] Assignee: Chrysler Corporation, Highland Park, Mich.

[21] Appl. No.: 511,604

[22] Filed: Jul. 7, 1983

[51] Int. Cl.³ .............................................. F16H 55/14
[52] U.S. Cl. .................................... 74/443; 192/30 V
[58] Field of Search ............. 74/443; 192/30 V, 53 F, 192/53 A, 53 E, 106.1

[56] References Cited

U.S. PATENT DOCUMENTS

| | | | |
|---|---|---|---|
| 2,221,894 | 11/1940 | White | 192/53 F |
| 2,633,955 | 4/1953 | Allen et al. | 192/53 E |
| 2,667,955 | 2/1954 | Bixby | 192/53 A |
| 2,961,856 | 11/1960 | Selzer | 74/443 X |

FOREIGN PATENT DOCUMENTS 0039866 3/1983 Japan.

Primary Examiner—George H. Krizmanich
Assistant Examiner—Dirk Wright
Attorney, Agent, or Firm—Edward P. Barthel

[57] ABSTRACT

An arrangement for dampening a transmission synchronizer. A plurality of T-shaped shoes are disclosed for assembly on the jaw toothed shoulder of the synchronizer main gear. The shoulder has a plurality of chordal flats with a radial bore formed therein. Each T-shaped shoe is molded of resilient material and includes a cross head portion and a stem for reception in its associated radial bore. The synchronizer stop ring has selected individual ones of its internal teeth omitted creating slots defined by the omitted tooth together with the adjacent root spaces. The cross head is sized to snugly contact the opposed flanks of the adjacent stop ring teeth. By urging the stop ring internal teeth into a neutral centered position with the gear teeth the invention obviates stop ring rattle by eliminating play between the stop ring and the main gear.

4 Claims, 4 Drawing Figures

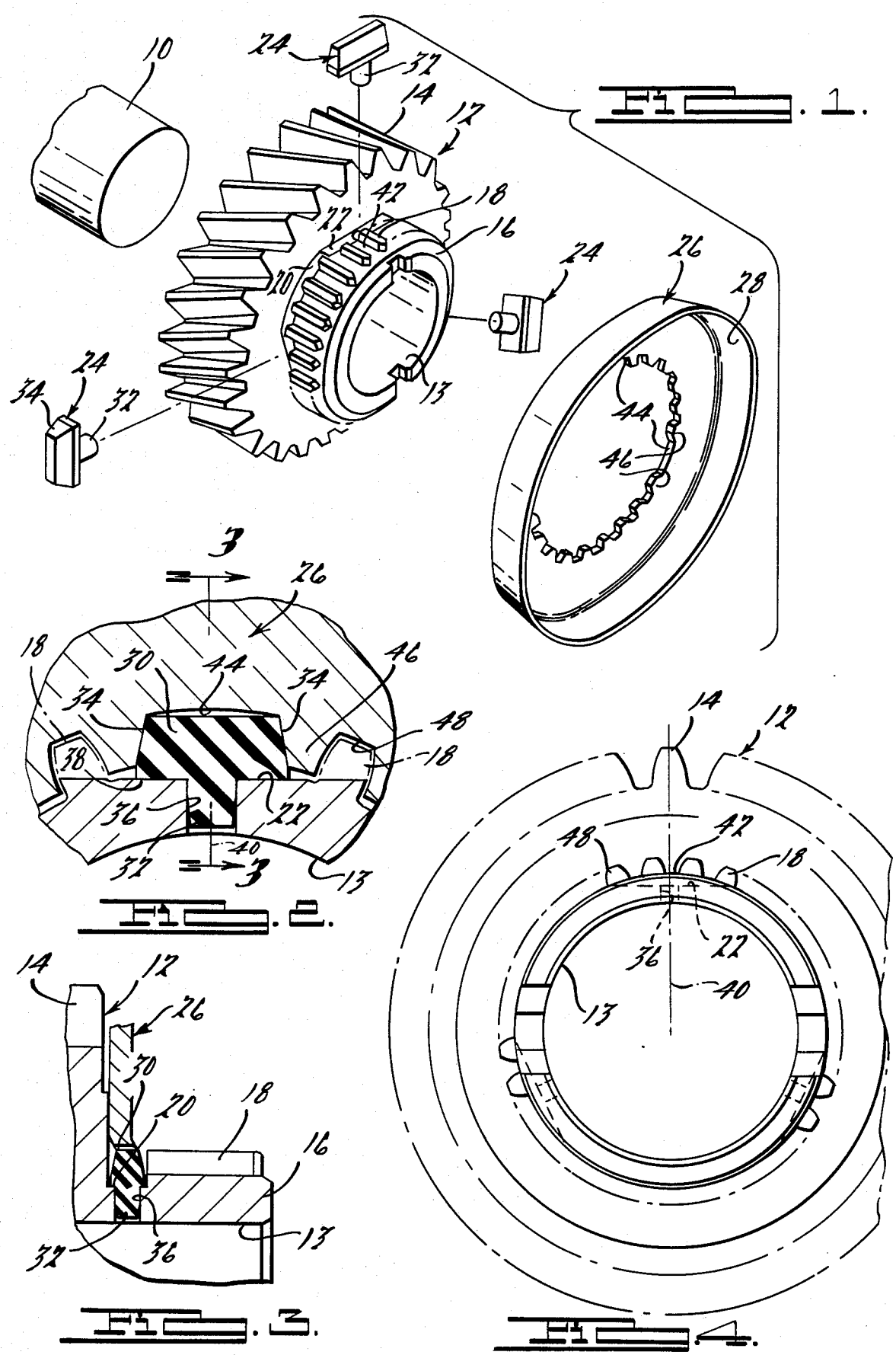

DAMPENING SHOES FOR SYNCHRONIZER GEARS

BACKGROUND OF THE INVENTION

This invention relates to anti-rattle devices in a change speed transmission synchronizer having gears which are constantly in mesh In prior art synchronizers it has been found that when internal teeth of a stop ring member are provided with selected tolerance allowing sufficient freedom of longitudinal movement, the member may vibrate and rattle with mating teeth under engine idle conditions. In some applications, such as in diesel powered vehicles, rattle of the synchronizer stop ring may produce a noticeable sound in the vehicle passenger compartment. The general problem of chattering of mating teeth has long been recognized as evidenced by the U.S. Pat. No. 2,961,856 issued Nov. 29, 1960 to John Selzer.

One object of the present invention is to provide improved means for dampening the rattle of a synchronizer stop ring in a vehicle transmission during no-load conditions.

It is another object to provide an anti-rattle arrangement which may be adapted to an existing synchronizer assembly.

SUMMARY OF THE INVENTION

The present invention provides a unique solution to the problem described above relating to transmission synchronizer noise problems. The synchronizer disclosed incorporates a plurality of elastomeric dampener shoes disposed around the splined outer diameter of the main gear's reduced shoulder. The splines have portions removed enabling a plurality of chordal surfaces to be formed at the base of the shoulder. Each chordal surface has a radial bore for receiving a stem portion of an elastomeric dampener shoe Each shoe includes a cross-head portion having a profile corresponding to the profile of a gap provided in the internal splined stop ring teeth. The gap profile is formed by omitting a stop ring internal tooth aligned on each chordal surface radial bore axis. The shoe head is thus resiliently captured between the opposed tooth flanks defining the gap. The shoes maintain the stop ring in its neutral mode during idle condition of the vehicle engine. The elastomeric head material is selected to yield upon application of a determined torque permitting the stop ring internal splined teeth and the main gear shoulder jaw teeth to engage and transmit the load from the input shaft to suitable output gear means.

BRIEF DESCRIPTION OF THE DRAWINGS

FIG. 1 is an exploded perspective view of a main gear, stop ring and dampener shoes of a synchronizer mechanism;

FIG. 2 is a fragmentary transverse sectional view of an assembled dampener shoe of FIG. 1;

FIG. 3 is a fragmentary longitudinal sectional view taken along the section line 3—3 of FIG. 2; and FIG. 4 is a fragmentary vertical elevational detail view of the main gear.

DETAILED DESCRIPTION OF THE INVENTION

Referring now to the drawings and particularly FIG. 1, there is shown a portion of a synchronizer wherein the numeral 10 designates a transmission shaft. The shaft is sized to receive a synchronizer main gear 12 of the type used in a pin-type blocking synchronizer, for example. The main gear 12 is formed with a central bore 13 sized to be affixed to the shaft 10. Helical clutch teeth 14 are formed on the main gear. The main gear 12 includes a reduced diameter hub portion 16 formed with axially extending external jaw teeth 18.

Intermediate the main gear large diameter helical gear 14 and the hub portion jaw teeth 18 is a reduced annular shoulder 20. The intermediate portion or shoulder 20 is provided with a plurality of circumferentially arranged machined seating surfaces or chordal flats 22 adapted to receive T-shaped dampener shoe members 24 which will be described in more detail later.

A female cone synchronizer stop ring member is shown at 26 formed with an internal tapered friction surface 28. Surface 28 is adapted to cooperate with an external tapered friction surface formed on axially extending annular flange portions of a suitable gear (not shown) of the clutch portion of known synchronizer assemblies. An example of a pin-type synchronizer is shown in U.S. Pat. No. 2,667,955 issued Feb. 2, 1954, to L. A. Bixby. Reference should be made to the Bixby patent for an explanation of a pin-type blocking synchronizer.

Considering now the T-shaped dampener shoe members 24, these members are preferably formed of resilient plastic material such as silicone rubber, for example. The shoes 24 each have a cross-head portion 30 extending normal to a cylindrical stem portion 32. The cross-head is provided at each end with inclined surfaces 34 the purpose of which will be explained hereinafter.

As best seen in FIGS. 2, 3 and 4 each seating surface 22 has a radially extending aperture or bore 36 centrally thereof. The bore 36 is sized to receive the stem 32 of one shoe dampener 24. The diameter of the bore is such that the stem is snugly received therein allowing flush contact between underside 38 of the cross-head and the seating surface 22.

In FIGS. 2 and 4 it will be seen that the bore 36 has its principal axis 40 aligned in a longitudinal plane that bisects the space or root 42 between the pair of adjacent external jaw teeth 18. Thus, when the shoe stem 32 is inserted in bore 36 the cross-head portion will be accurately and symmetrically centered on its chordal flat 22 relative to the jaw teeth 18.

FIG. 1 shows that selected individual stop gear internal teeth are removed to create circumferentially spaced gaps such as the gaps 44. As seen in FIG. 2 a gap 44 consists of a removed internal tooth 46 and two adjacent root spaces 48. The cross-head portion 30 of each shoe 24 is sized to be snugly received in its associated gap 44. It will be noted that the cross-head end walls 34 are sloped inwardly at a predetermined angle to match the side flank angle of the internal teeth 46.

The result is that with the stop gear 26 received on the spaced shoes it will be resiliently maintained on its zero torque or neutral position so that any rattle, impact, or ringing noises are effectively eliminated. The shoes 24, which as seen in FIG. 4 are three in number located in the preferred form on substantially equally spaced arcuate centers, obviate play between the unloaded meshed main gear and the stop gear teeth 18.

Although a preferred embodiment of the invention has been illustrated and described in detail, it will be understood that various changes and modifications maybe made in the disclosed embodiment without departing from the scope and spirit of the invention as defined in the appended claims.

What is claimed is:

1. An anti-rattle arrangement for dampening oscillatory vibrations in a power transmission synchronizer mechanism having an input shaft provided with a journal surface, an input main gear having a through bore bearing surface received on said journal surface, said main gear including a reduced diameter shoulder portion formed with axially extending external jaw teeth, and a stop ring having a central opening therein formed with internal teeth adapted for slidable engagement with said shoulder jaw teeth, said anti-rattle arrangement comprising a plurality of chordal surfaces formed on said shoulder portion, a radial bore in each said chordal surface, said radial bore having its axis in a longitudinal radial plane of said main gear principal axis and oriented equidistant from two adjacent shoulder external jaw teeth, said stop ring having a plurality of gaps formed by certain ones of its internal teeth being omitted, each said stop ring gap having its radial axis of symmetry located in said radial plane when said synchronizer mechanism is in its neutral condition, a plurality of T-like shoes molded of elastomeric material, each said shoe including a cross-head portion and a stem portion, each said shoe stem portion received in one of said radial bores, each said cross-head underface seated flush with its associated chordal surface, and each said cross-head sized for snug reception in an associated stop ring gap upon said stop ring being axially seated on said reduced diameter shoulder and its internal teeth in meshing engagement with said external jaw teeth, such that said shoes maintain said stop ring gear internal teeth in spaced relation with said external jaw teeth, so as to obviate rattle between said main gear and said stop ring gear during no-load conditions of said synchronizer mechanism.

2. The arrangement as set forth in claim 1 wherein each shoe cross-head portion is generally rectangular in transverse section with its opposed side faces being sloped inwardly at a predetermined angle complementary to the flank angle of its associated stop ring internal teeth.

3. The arrangement as set forth in claim 2 wherein the cross-head stem portions are cylindrical and have a diameter a predetermined distance less than the longitudinal dimension of the cross-head portion.

4. The arrangement as set forth in claim 1 wherein there are three T-like shoes, and said shoes being substntially equally spaced around the periphery of said shoulder position.

* * * * *